July 4, 1950      H. J. VON BAEYER      2,514,148
APPARATUS FOR PULSE PHASE-MODULATION Filed Oct. 14, 1948      2 Sheets-Sheet 1

Inventor:
Hans Jacob von Baeyer,
By Pierce, Scheffler & Parker,
Attorneys.

Patented July 4, 1950

2,514,148

UNITED STATES PATENT OFFICE 2,514,148

APPARATUS FOR PULSE PHASE MODULATION

Hans Jakob von Baeyer, Baden, Switzerland, assignor to "Patelhold" Patentverwertungs- & Elektro-Holding A.-G., Glarus, Switzerland Application October 14, 1948, Serial No. 54,455
In Switzerland October 17, 1947

9 Claims. (Cl. 332—9)

This invention relates to apparatus for pulse phase modulation, and particularly to apparatus for reducing or eliminating the non-linear distortion which is characteristic of pulse phase modulation process in which a sinusoidal alternating voltage of high frequency is impressed upon a modulating voltage, and impulses of short duration are emitted at the moments when the sum of the two voltages passes through zero.

The invention is not limited to but is particularly useful in multichannel communication systems in which each phase of a multiphase high frequency current constitutes a channel, each phase being individually combined with a modulating voltage to develop a sequence of phase or time-displaced impulses. An advantage of this type of multichannel communication with phase-displaced oscillations is that the successive passages through zero voltage of a sinusoidal wave remain equidistant in time independently of the aging of and the operating voltages on the amplifying tubes so that, even with a large number of channels, there can be no inadvertent drifts or displacements of the channels and thus no disturbances from variations in tube characteristics and tube voltages are to be feared. Unfortunately, however, the prior pulse phase modulation methods have suffered from a not inconsiderable lack of linearity due to the fact that the successive momentary values of the modulating voltage which determined the phase displacements of successive pulses did not vary with the amplitude, at points equidistant in time, of the modulation voltage.

Objects of the present invention are to provide apparatus for pulse phase modulation, in one or more channels, which reduces or eliminates the distortion which was characteristic of prior apparatus. Objects are to provide apparatus for pulse phase modulation in which the successive modulation components vary with the amplitude of the modulating voltage at points equidistant in time or uniformly spaced along the modulation wave. An object is to provide apparatus of the type stated in which is developed a sequence of square wave voltage pulses significant of the amplitude of a modulating voltage at cyclically repeated periods determined by a sinusoidal wave of high frequency, and such square wave voltages are added to a phase-displaced voltage of the high frequency to develop voltage pulses at the instants the sum of such voltages passes through zero.

These and other objects and the advantages of the invention will be apparent from the following specification when taken with the accompanying drawings in which.

Figure 1:
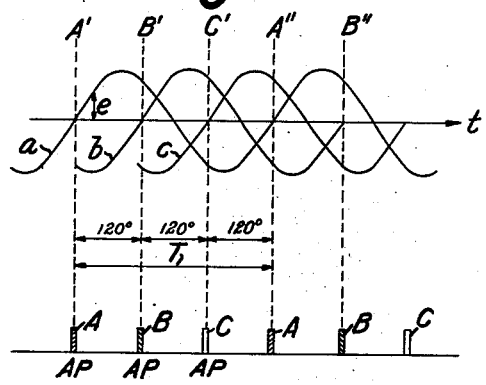
Figs. 1 and 2 are diagrams showing characteristic voltage relations in a pulse phase modulation system.

In Fig. 1, the curves $a$, $b$, $c$ represent three sinusoidal voltages which follow each other with a phase difference of $$\frac{360}{3} = 120°$$

in each case. Each curve of sinusoidal voltage $e$ passes through the zero voltage axis at moments $A', B', C'; A'', B'', C''$, etc., to develop interleaved series of impulses A, B and C in cyclic sequence, such impulses occurring at uniformly spaced moments AP, AP, etc. in the case of zero modulation. Individual modulations may be impressed upon the sinusoidal voltages before the pulse formation, and instants of voltage zero for each voltage wave will thereby undergo individual displacements in time. If, at the instants of voltage zero, impulses of the same amplitude are emitted, a three-channel pulse phase modulation is obtained.

Figure 2:
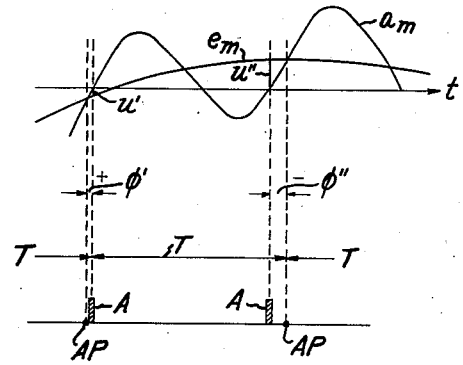

When the high frequency sinusoidal voltages are modulated at a lower signal frequency, the voltage wave, for example wave $a$ of channel A, is added to the modulation voltage $e_m$, see Fig. 2, to develop a modulated wave $a_m$. The instants at which the voltage waves $a_m$ pass through zero on the time axis $t$ do not now coincide with points AP which are cyclically repeated at time intervals T, and the voltage pulses A, A are displaced from points AP by time values $+\phi', -\phi''$, etc., which are a measure of the pulse phase modulation. The momentary modulation values $u'$, $u''$ at the instants of pulse emission do not correspond to the amplitude of the modulation voltage $e_m$ at cyclically repeated time intervals but correspond to the amplitude of the modulating voltage at successive non-uniform intervals, i. e. at the instants when the sum voltage $a_m$ passes through zero. The displacement of the modulation values $u', u''$, etc., in point of time results in a non-linear distortion which is characteristic of this type of pulse phase modulation.

According to this invention, the successive modulation components which are added to a sinusoidal or substantially sinusoidal voltage of constant high frequency at about the instants at which the high frequency voltage passes through zero as it increases in a positive sense correspond, in amplitude, to the modulation voltage values at instants equally spaced in time. The modulation voltages $e_m$ is "scanned" at instants cyclically repeated at the frequency of the sinusoidal voltage to obtain voltage pulses varying with the amplitude of the modulating signal at points equidistant in time and, through pulse-stretching circuits, square wave pulses of correspondingly varying amplitude are developed from such voltage pulses for combination with the sinusoidal voltage to determine the timing or phase displacement of the emitted signal pulses.

Figure 3:
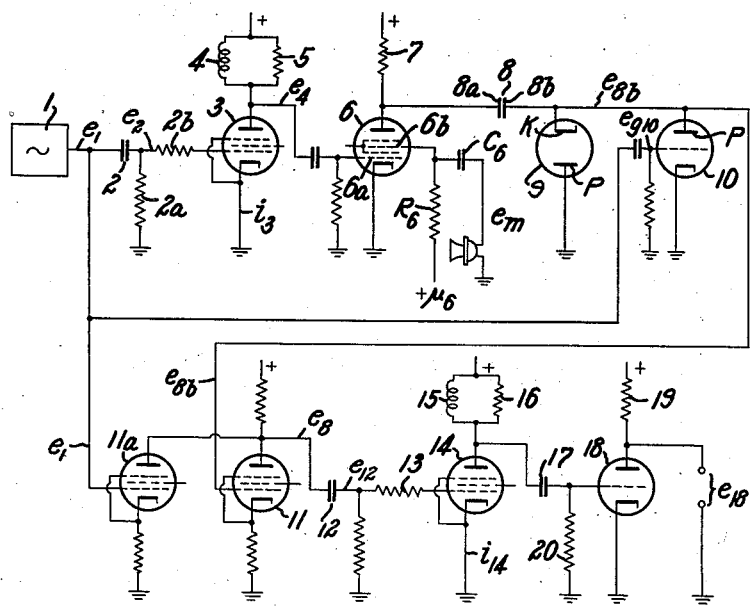
Fig. 3 is a schematic circuit diagram of apparatus embodying the invention.
Figure 4:
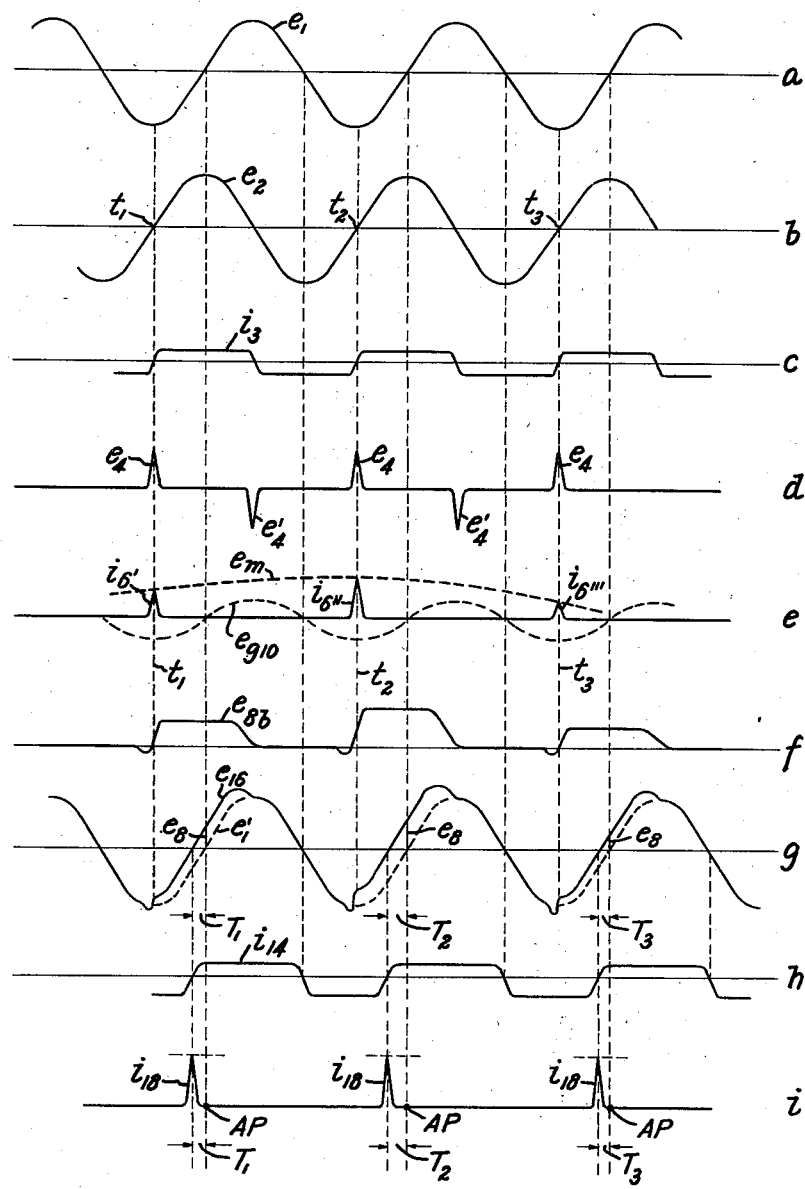
Fig. 4 is a curve sheet showing typical current and voltage values at different points in the Fig. 3 circuit.

An apparatus or circuit operating in accordance with this general method, as shown in Fig. 3, includes a constant frequency generator 1 developing a sinusoidal voltage $e_1$, Fig. 4a, which preferably is at least twice the highest modulation frequency to be transmitted, thereby to limit non-linear distortion to a small or negligible value. The voltage $e_1$ is impressed upon a phase displacer, comprising series condenser 2 and shunt resistor 2a, and the resulting voltage $e_2$ which is displaced by at least 45° and preferably by about 90°, Fig. 4b, is passed to the control grid of a tube 3 by a series resistance 2b which is high with respect to the grid-cathode resistance of tube 3. Then anode current $i_3$ of tube 3, Fig. 4c, is of trapezoidal wave form in view of grid current limitation during the positive half-cycle of applied voltage $e_2$ and the blocking of the anode current during negative half-cycles. The anode load of tube 3 includes a choke 4 shunted by a damping resistor 5 and, at moments $t_1$, $t_2$, etc., when the applied voltage $e_2$ increases in a positive sense to pass through zero, the steep wave front of the anode current $i_3$ results in sharp positive voltage pulses $e_4$, Fig. 4d, at the anode of tube 3. The circuit constants are such that the voltage pulses $e_4$ do not exceed about 3% of the periods of the highest frequency components of the modulation or signal voltage which is to be transmitted. Negative voltage pulses $e'_4$ are developed at instants when the applied voltage $e_2$ decreases from a positive value and passes through zero, and the voltage pulses $e_4$, $e'_4$ are applied to a grid 6a of the hexode 6 which is so energized that an anode current is developed only during peaks of the positive voltage pulses $e_4$. The modulating voltage $e_m$ is impressed upon another grid 6b of the tube 6 through a blocking condenser $C_6$. The steady direct current voltage $+e_6$ impressed on grid 6b through a resistor $R_6$ is such that the plate current pulses $i_6'$, $i_6''$, etc., are modulated in amplitude as a linear function of the modulation voltage $e_m$ at instants $t_1$, $t_2$, etc., which are uniformly spaced in time, i. e. which recur cyclically at the frequency of the sinusoidal voltages $e_1$, $e_2$. Amplitude modulated voltages are thereby developed across the plate resistance 7 of the tube 6.

The plate of tube 6 is connected, through condenser 8, to the cathode K of a diode 9 having a grounded anode P, to the anode or plate P of an amplifier tube 10, and to the grid of a tube 11. A positive voltage impulse $e_4$ on the control grid of tube 6 reduces the voltage on the plate electrode of the tube and the plate 8a of condenser 8, which plate is connected to the plate electrode of tube 6, is thereby charged negatively rapidly with respect to condenser plate 8b which is connected to the cathode K of diode 9; the necessary charging current being supplied through the diode. Upon the disappearance of the control impulse on tube 6, the plate voltage again increases to its former normal value and condenser plate 8b thereby assumes a positive voltage with respect to ground. This voltage or charge $e_{8b}$ remains on the condenser plate 8b for about one-half cycle and successive charges correspond in amplitude to the instantaneous values of the modulation voltage $e_m$ at cyclically repeated moments $t_1$, $t_2$, etc. The voltage charge can not leak off through diode 9 or through the tube 10 so long as the latter is non-conductive. Tube 10 is blocked at time instants $t_1$, $t_2$, etc., since its grid is then carried negative by an alternating control voltage $e_{g10}$, Fig. 4e, derived from the generator 1. The square wave voltage impulse $e_{8b}$ retains substantially its initial value for approximately a half-cycle of the voltage $e_1$ until the grid voltage of tube 10 becomes positive and the tube 10 is rendered conductive. When this occurs, the voltage $e_{8b}$ collapses and falls to zero, Fig. 4f.

The plate 8b of condenser 8 is directly connected to the control grid of tube 11, and therefore rectangular voltage pulses $e_{8b}$ are impressed upon the control grid, the amplitudes of such pulses being proportional to the instantaneous values of the modulation voltage $e_m$ at the equidistant time instants $t_1$, $t_2$, etc., determined by the sinusoidal voltage $e_1$ of constant frequency. The voltage $e_1$ is impressed upon the control grid of a tube 11a, and the plates of tubes 11 and 11a are connected to each other and through a coupling condenser 12 and series resistor 13 to the control grid of a tube 14. A sinusoidal voltage $e'_1$ corresponding to the control voltage $e_1$ is imposed upon the coupling condenser 12 from tube 11a, and on this is superposed voltage pulses $e_8$ developed by tube 11 from the impulse voltages $e_{8b}$ see Fig. 4g.

In view of the phase displacement of voltages $e_1$ and $e_2$, each voltage pulse $e_8$ starts at about a negative peak of the voltage $e_{12}$ and terminates about at the moment of a positive peak. Each voltage pulse $e_8$ is impressed on the approximately linear part of an ascending flank of the control voltage $e'_1$, and the pulses start in advance of the positive ascending portions of the voltage $e'_1$ by an angle of approximatly 45° to 90°, i. e. in advance, in point of time, of each second passage through zero of the sinusoidal control voltage.

The passage through zero of the sum-voltage $e_{12}$ is displaced in relation to the passage through zero of the control voltage $e'_1$ by time angles $T_1$, $T_2$, etc. The impressed voltage values $e_8$ are comparatively small, so that the resulting time or phase deviations $T_1$, $T_2$, etc., are proportional to the voltage $e_8$ and therefore to the corresponding instantaneous values of the modulation voltage $e_m$ at the equidistant time instants $t_1$, $t_2$, etc. Every second passage of the sum-voltage $e_{12}$ through zero is thus modulated in time and phase respectively according to instantaneous values of the modulation voltage at equidistant points in time.

The series resistance 13 in the input circuit of tube 14 is of high value, and the plate circuit load comprises a differential choke 15 and damping resistor 16. The plate current $i_{14}$ of tube 14 comprises square wave pulse of alternate positive and negative polarity, and voltage pulses of short duration occur intermittently at the choke 15 upon the passages through zero of the current $i_{14}$. The plate of tube 14 is connected through a coupling condenser 17 to the control grid of a tube 18, having a resistive plate load 19, the control grid being returned to ground through a grid resistor 20. The voltage pulses developed at the plate of tube 14 are thus impressed upon the grid of tube 18, and the initial tube potentials are so selected that only the positive voltage pulses, corresponding to instants when the plate current $i_{14}$ shifts from a negative to a positive value, are effective to produce positive pulses $i_{18}$ of plate current in tube 18, Fig. 4i. Current pulses $i_{18}$ are of substantially constant amplitude and are displaced in time and phase from the uniformly spaced points or instants AP at which the unmodulated control voltage $e'_1$ would pass through zero in an increasing sense by amounts $T_1$, $T_2$, etc., corresponding to instantaneous values of the modulation voltage $e_m$ at equally spaced instants $t_1$, $t_2$, etc. Correspondingly phase modulated voltage pulses $e_{18}$ are developed between the plate of tube 18 and ground, and may be passed to any desired type of transmitter or load circuit.

Instead of the periodical charging and discharging of the condenser 8 within a fourth to a half period of the impulse sequence according to Fig. 4e, accumulation of the charge over the whole period could be employed, the condenser 8 remaining constantly charged each time until the next impulse, and then only changing over to a new condition of charge agreeing with the new impulse. Since this new condition of charge could be above as well as below the former condition of change, a simple diode that can switch only in one direction is no longer sufficient. On the contrary, a two-way switch is required that can be built up in the known way by connecting together two or four diodes.

It is to be understood that the invention is not limited to the particular circuit herein illustrated and described, and that functionally equivalent tube and circuit elements for carrying out the novel modulation process fall within the spirit and scope of the invention as set forth in the following claims.

I claim:

1. The process of pulse phase modulation whch comprises generating a control sinusoidal voltage of constant frequency, developing from a modulation voltage a sequence of peaked current pulses varying in amplitude with the instantaneous values of the modulation voltage at intervals cyclically repeated at said control frequency, developing from said peaked current pulses a sequence of square wave voltage pulses, superposing said square wave voltage pulses upon a second sinusoidal voltage derived from said control voltage during alternate half-cycles in which said second sinusoidal voltage varies from a peak of one polarity towards a peak of the opposite polarity to develop an amplitude modulated sum-voltage, and deriving a sequence of current pulses at successive time instants at which said sum-voltage passes through zero.

2. The process as recited in claim 1, wherein the frequency of the control sinusoidal voltage is at least double the highest modulation freqeuncy to be transmitted.

3. The process as recited in claim 1, wherein the duration of said peaked current pulses is of the order of not more than 3% of the period of the highest modulation freqeuncy to be transmitted.

4. Apparatus for pulse phase modulation in single or multichannel transmission systems, said apparatus comprising for one transmission channel, a constant frequency generator developing a sinusoidal control voltage, a source of modulation voltage, means responsive jointly to said control voltage and said modulation voltage to develop square wave voltage pulses varying in amplitude with instantaneous values of said modulation voltage at instants cyclically repeated at the frequency of said control voltage, means responsive jointly to said control voltage and to said square wave voltage pulses to develop a sum-voltage of approximately sinusoidal form, the square wave voltage pulses being added to a sinusoidal voltage during half-cycles thereof between successive voltage peaks of different polarity, and means developing phase displaced current pulses at instants when the sum-voltage passes through zero.

5. Apparatus for pulse phase modulation as recited in claim 4, wherein said means for developing square wave voltage pulses includes a vacuum tube having a control grid cooperating with a plate and cathode, a circuit including a coupling condenser and a series resistor of high ohmic value connecting said control grid to said generator, a grid resistor connected between said cathode and the function of said coupling condenser and series resistor, and a choke coil in the plate circuit of said tube.

6. Apparatus for pulse phase modulation as recited in claim 4, wherein said means for developing square wave voltage pulses comprises means for developing from said control voltage a series of peaked voltage pulses of the same polarity, and of the frequency of said control voltage, a vacuum tube having two grids cooperating with a cathode and plate, circuit elements for impressing said peaked voltage pulses upon one of said grids, and circuit elements for impressing said modulation voltage upon the other of said grids.

7. Apparatus for pulse phase modulation as recited in claim 6, wherein said means for developing from said control voltage a series of peaked voltage pulses includes a vacuum tube having a control grid cooperating with a plate and cathode, a circuit including a coupling condenser and a series resistor of high ohmic value connecting said control grid to said generator, a grid resistor conected between said cathode and the junction of said coupling condenser and series resistor, and a choke coil in the plate circuit of said tube.

8. Apparatus for pulse phase modulation as recited in claim 4, wherein said means responsive jointly to said control voltage and square wave voltage pulses comprises a pair of vacuum tubes having their plates connected in parallel and through a coupling condenser and resistor to a third vacuum tube, circuit elements for impressing the square wave voltage pulses upon one tube of said pair, and circuit connections for impressing said sinusoidal control voltage upon the other tube of said pair.

9. Apparatus for pulse phase modulation as recited in claim 8, wherein said means for developing phase displaced current pulses includes a choke coil in the plate circuit of said third vacuum tube, and an amplifier tube having a control grid connected to the plate of said third tube.

HANS JAKOB von BAEYER.

REFERENCES CITED

The following references are of record in the file of this patent:

UNITED STATES PATENTS

| Number | Name | Date |
| --- | --- | --- |
| 2,406,019 | Labin | Aug. 20, 1946 |

Certificate of Correction

Patent No. 2,514,148 July 4, 1950

HANS JAKOB von BAEYER

It is hereby certified that errors appear in the printed specification of the above numbered patent requiring correction as follows:

Column 5, line 45, for "whch" read *which*; column 6, line 25, for the word "function" read *junction*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*